United States Patent Office 3,502,612
Patented Mar. 24, 1970

3,502,612
RUBBER STABILIZED WITH MIXTURES OF A PHENYLENE DIAMINE AND A DIFFERENT AMINE COMPOUND
Edwin J. Latos, Chicago, Ill., assignor to Universal Oil Products Company, Des Plaines, Ill., a corporation of Delaware
No Drawing. Filed May 29, 1967, Ser. No. 642,158
Int. Cl. C08c 11/46
U.S. Cl. 260—45.8                      8 Claims

ABSTRACT OF THE DISCLOSURE

Preserving a phenylene diamine antiozonant in vulcanized rubber by incorporating in the rubber polymer prior to vulcanization the phenylene diamine antiozonant and a nitrogen-containing compound of different chemical composition.

BACKGROUND OF THE INVENTION

Antiozonants presently being used in rubber are of the phenylene diamine type. In one embodiment the antiozonant is an N,N'-di-sec-alkyl-p-phenylene diamine in which the alkyl group preferably contains from 6 to 9 carbon atoms and thus includes N,N'-di-sec-hexyl-p-phenylene diamine, N,N'-di-sec-heptyl-p-phenylene diamine, N,N'-di-sec-octyl-p-phenylene diamine and N,N'-di-sec-nonyl-p-phenylene diamine. While these are the preferred antiozonants, it is understood that the sec-alkyl groups may contain from 3 to about 20 carbon atoms each and thus will include N,N'-di-isopropyl-p-phenylene diamine, N,N'-di-sec-butyl-p-phenylene diamine, N,N'-di-sec-pentyl-p-phenylene diamine, N,N'-di-sec-decyl-p-phenylene diamine, N,N'-di-sec-undecyl-p-phenylene diamine, N,N'-di-sec-dodecyl-p-phenylene diamine, N,N'-di-sec-tridecyl-p-phenylene diamine, N,N'-di-sec-tetradecyl-p-phenylene diamine, N,N'-di-sec-hexadecyl-p-phenylene diamine, N,N'-di-sec-heptadecyl-p-phenylene diamine, N,N'-di-sec-octadecyl-p-phenylene diamine, N,N'-di-sec-nonadecyl-p-phenylene diamine and N,N'-di-sec-eicosyl-p-phenylene diamine.

In another embodiment, the phenylene diamine antiozonant is of the N-alkyl-N'-aryl-p-phenylene diamine type in which the alkyl group contains from 3 to about 20 and preferably from 3 to about 12 carbon atoms. Preferred compounds include N-isopropyl-N'-phenyl-p-phenylene diamine, N-sec-butyl-N'-phenyl-p-phenylene diamine, N-sec-pentyl-N'-phenyl-p-phenylene diamine, N-sec-hexyl-N'-phenyl-p-phenylene diamine, N-sec-heptyl-N'-phenyl-p-phenylene diamine, N-sec-octyl-N'-phenyl-p-phenylene diamine, N-sec-nonyl-N'-phenyl-p-phenylene diamine, N-sec-decyl-N'-phenyl-p-phenylene diamine, N-sec-undecyl-N'-phenyl-p-phenylene diamine and N-sec-dodecyl-N'-phenyl-p-phenylene diamine. Still other antiozonants include N,N'-di-cycloalkyl-phenylene diamines and particularly N,N'-dicyclohexyl-p-phenylene diamine. Other antiozonants in this embodiment include N,N'-dicyclopropyl-p-phenylene diamine N,N'-dicyclobutyl-p-phenylene diamine, N,N'-dicyclopentyl-p-phenylene diamine, N,N'-dicycloheptyl-p-phenylene diamine, N,N'-dicyclooctyl-p-phenylene diamine, etc.

It is understood that a mixture of the antiozonants may be used including, for example, a mixture of N,N'-di-sec-alkyl-p-phenylene diamines or a mixture of N,N'-di-sec-alkyl-p-phenylene diamine and N-sec-alkyl-N'-phenyl-p-phenylene diamine as illustrated, for example, by a mixture of N,N'-di-sec-octyl-p-phenylene diamine and N-sec-octyl-N'-phenyl-p-phenylene diamine and/or N-sec-hexyl-N'-phenyl-p-phenylene diamine.

DESCRIPTION OF THE INVENTION

As hereinbefore set forth the phenylene diamine antiozonants are very effective for the desired purpose. However, it has been found that there is a loss of the antiozonant after vulcanization of the rubber polymer. The present invention offers a novel method of reducing the loss of the phenylene diamine antiozonant during vulcanization of the rubber polymer.

In one embodiment, the present invention relates to a method of preserving a phenylene diamine antiozonant in vulcanized rubber which comprises incorporating in the rubber polymer prior to vulcanization thereof said phenylene diamine antiozonant and a nitrogen-containing compound of a different chemical composition.

The present invention is used to preserve phenylene diamine antiozonants and to prevent its loss, destruction or other modification during vulcanization of the rubber polymer. The phenylene diamine antiozonant generally will be selected from those hereinbefore set forth. It is understood that the phenylene diamine antiozonant will be used along with other additives generally incorporated in the rubber polymer prior to vulcanization. These other additives may include one or more of antioxidants, curing accelerators, softeners, extenders, reinforcing agents, anti-scorching agents, carbon, zinc oxide, stearic acid, sulfur, wax, oil, etc.

In accordance with the present invention, loss of the phenylene diamine antiozonant during vulcanization of the rubber polymer is reduced by incorporating in the rubber recipe a nitrogen-containing compound of a chemical composition different from the phenylene diamine antiozonant. In one embodiment the nitrogen-containing compound is an aliphatic monoamine or polyamine and may be a primary, secondary or tertiary amine. These amines may contain from 1 to 50 carbon atoms or more and preferably contain from 4 to 20 carbon atoms. The preferred monoamines include butylamine, pentylamine, hexylamine, heptylamine, octylamine, nonylamine, decylamine, undecylamine, dodecylamine, tridecylamine, tetradecylamine, pentadecyl, hexadecyl, heptadecyl, octadecylamine, nonadecylamine and eicosylamine. The amines may be prepared from fatty acid derivatives and, thus, may comprise tallow amine, hydrogenated tallow amine, lauryl amine, stearyl amine, oleyl amine, linoleyl amine, coconut amine, soya amine, etc.

Of the polyamines, N-alkyl diaminoalkanes are preferred. A particularly preferred amine of this class comprises an N-alkyl-1,3-diaminopropane in which the alkyl group contains from about 1 to 25 or more carbon atoms. A number of N-alkyl diaminoalkanes of this class are available commercially, such as "Duomeen T" and "Diam 26" in which the alkyl group is derived from tallow and contains from about 12 to about 20 carbon atoms per group and mostly 16 to 18 carbon atoms. Other N-alkyl-1,3-diaminopropanes may be prepared to contain any number of carbon atoms desired in the alkyl group and thus the alkyl group is selected from butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc.

While the N-alkyl-1,3-diaminopropanes are preferred, it is understood that other suitable N-alkyl diaminoalkanes may be employed. Illustrative examples include
N-alkyl-1,2-diaminoethane,
N-alkyl-1,2-diaminopropane,
N-alkyl-1,2-diaminobutane,
N-alkyl-1,3-diaminobutane,
N-alkyl-1,4-diaminobutane,
N-alkyl-1,2-diaminopentane,
N-alkyl-1,3-diaminopentane,
N-alkyl-1,4-diaminopentane,
N-alkyl-1,5-diaminopentane,
N-alkyl-1,2-diaminohexane,
N-alkyl-1,3-diaminohexane, N-alkyl-1,4-diaminohexane,
N-alkyl-1,5-diaminohexane,
N-alkyl-1,6-diaminohexane, etc.

Other polyamines include
ethylenediamine,
propylenediamine,
butylenediamine,
pentylenediamine,
hexylenediamine,
heptylenediamine,
octylenediamine, etc.,
diethylenethiamine,
dipropylenetriamine,
dibutylenetriamine,
dipentylenetriamine,
dihexylenetriamine,
diheptylenetriamine,
dioctylenetriamine, etc.,
triethylenetetraamine,
tripropylenetetraamine,
tributylenetetraamine,
tripentylenetetraamine,
trihexylenetetraamine,
triheptylenetetraamine,
trioctylenetetraamine, etc.,
tetraethylenepentaamine,
tetrapropylenepentaamine,
tetrabutylenepentaamine,
tetrahexylenepentaamine,
tetraheptylenepentaamine,
tetraoctylenepentaamine, etc.,
pentaethylenehexaamine,
pentapropylenehexaamine,
pentabutylenehexaamine,
pentapentylenehexaamine,
pentahexylenehexaamine,
pentaheptylenehexaamine,
pentaoctylenehexaamine, etc., and particularly these polyamines in which one or more of the nitrogen atoms is substituted with an alkyl group of from 1 to 25 or more carbon atoms.

In another embodiment the amine is an aromatic amine. Aromatic monoamines include aniline, toluidines, xylidines, etc., naphthylamine, anthracylamine, rosin amine, etc., as well as the N-mono- and N,N-dialkylated aromatic amines in which the alkyl group or groups contain from 1 to 25 carbon atoms or more. Illustrative examples of such compound include N-methylaniline,
N,N-di-methylaniline,
N-ethylaniline,
N,N-di-ethylaniline,
N-propylaniline,
N,N-di-propylaniline,
N-butylaniline,
N,N-di-butylaniline,
N-amylaniline,
N,N-di-amylaniline,
N-hexylaniline,
N,N-di-hexylaniline,
N-heptylaniline,
N,N-diheptylaniline,
N-octylaniline,
N,N-di-octylaniline,
N-nonylaniline,
N,N-di-nonylaniline,
N-decylaniline,
N,N-di-decylaniline,
N-undecylaniline,
N,N-di-undecylaniline,
N-dodecylaniline,
N,N-di-dodecylaniline, etc., as well as the corresponding substituted toluidines, xylidines, naphthylamines, anthracylamines.

In still another embodiment the amine may contain halogen as, for example, in compounds such as chloroaniline, 2,3-dichloroaniline, 2,4-dichloroaniline, 2,5-dichloroaniline, 2,6-dichloroaniline, 3,4-dichloroaniline, 3,5-dichloroaniline, bromoaniline, 2,3-dibromoaniline, 2,4-dibromoaniline, 2,5-dibromoaniline, 2,6-dibromoaniline, 3,4-dibromoaniline, 3,5-dibromoaniline, etc.

In another embodiment the aromatic amine is a diarylamine including, for example, diphenylamine, aminodiphenylamine, diaminodiphenylamine, dinaphthylamine, aminodinaphthylamine, diaminodinaphthylamine, etc. In the polyamino aromatic compounds, the nitrogen atoms may be in the position ortho, meta or para to each other. The amino or diaminodiphenylamines may contain an alkyl group attached to one or both nitrogen atoms and the alkyl group may contain from 1 to 25 or more carbon atoms each. Illustrative compounds include p,p'-di-methylaminodiphenylamine,
p,p'-di-ethylaminodiphenylamine,
p,p'-di-propylaminodiphenylamine,
p,p'-di-butylaminodiphenylamine,
p,p'-di-amylaminodiphenylamine,
p,p'-di-hexylaminodiphenylamine,
p,p'-di-heptylaminodiphenylamine,
p,p'-di-octylaminodiphenylamine,
p,p'-di-nonylaminodiphenylamine,
p,p'-di-decylaminodiphenylamine, etc.,
o,p'-di-methylaminodiphenylamine,
o,p'-di-ethylaminodiphenylamine,
o,p'-di-propylaminodiphenylamine,
o,p'-di-ethylaminodiphenylamine,
o,p'-di-propylaminodiphenylamine,
o,p'-di-butylaminodiphenylamine,
o,p'-di-amylaminodiphenylamine,
o,p'-di-hexylaminodiphenylamine,
o,p'-di-heptylaminodiphenylamine,
o,p'-di-octylaminodiphenylamine,
o,p'-di-nonylaminodiphenylamine,
o,p'-di-decylaminodiphenylamine, etc.,
N-alkyldiaminodiphenylamine,
N,N,N'-trialkyldiaminodiphenylamine,
N,N,N',N'-tetraalkyldiaminodiphenylamine, etc.

In still another embodiment the amine comprises such compounds as aminodiphenyl ether,
N-alkylaminodiphenyl ether,
N,N'-dialkyldiaminodiphenyl ether,
N,N,N'-trialkyldiaminodiphenyl ether,
N,N,N',N'-tetraalkyldiaminodiphenyl ether,
aminodiphenyl sulfide,
N-alkylaminodiphenyl sulfide,
N,N'-dialkyldiaminodiphenyl sulfide,
N,N,N'-trialkyldiaminodiphenyl sulfide,
N,N,N',N'-tetraalkyldiaminodiphenyl sulfide,
aminodiphenylmethane,
N-alkylaminodiphenylmethane,
N,N'-dialkyldiaminodiphenylmethane,
N,N,N'-trialkyldiaminodiphenylmethane,
N,N,N',N'-tetraalkyldiaminodiphenylmethane,
aminodiphenylethane,
N-alkylaminodiphenylethane,
N,N'-dialkyldiaminodiphenylethane,
N,N,N'-trialkyldiaminodiphenylethane,
N,N,N',N'-tetraalkyldiaminodiphenylethane,
aminodiphenylpropane,
N-alkylaminodiphenylpropane,
N,N'-dialkyldiaminodiphenylpropane,
N,N,N'-trialkyldiaminodiphenylpropane,
N,N,N',N'-tetraalkyldiaminodiphenylpropane,
aminodiphenylbutane,
N-alkylaminodiphenylbutane,
N,N'-dialkyldiaminodiphenylbutane,
N,N,N'-trialkyldiaminodiphenylbutane,
N,N,N',N'-tetraalkyldiaminodiphenylbutane, etc.

in which the alkyl group or groups contain from 1 to 25 or more carbon atoms each.

In another embodiment the amine comprises a cycloalkyl amine which may be a monoamine or polyamine. Monoamines include cyclobutyl amine, cyclopentyl amine, cyclohexyl amine, cycloheptyl amine, cyclooctyl amine, etc., and these amines containing one or more alkyl substituents attached to the nucleus and/or to the nitrogen atom, the alkyl substituents containing from 1 to 25 or more carbon atoms each. Polyamines include cyclobutyl diamine, cyclopentyl diamine, cyclohexyl diamine, cycloheptyl diamine, cyclooctyl diamine, etc., dicycloalkyl triamines, tricycloalkyl tetraamines, tetracycloalkyl pentaamines, etc., and these polyamines in which one or more of the nitrogen atoms and/or the nucleus is substituted by an alkyl group containing from 1 to 25 or more carbon atoms each. In general, the cyclohexyl amine and cyclohexyl diamine are preferred.

In still another embodiment the amine may contain other substituents and particularly sulfur. The additional sulfur in the amine and, accordingly, in the final product may be of advantage for use in rubber. In one embodiment the sulfur-containing amine is prepared by reacting carbon disulfide with the amine, and particularly with an N-alkylated or N,N'-dialkylated alkylene polyamine. Particularly preferred substituted amines in this embodiment include the product formed by reacting carbon disulfide with N,N'-dialkyl-ethylenediamine or with $N^1,N^3$-dialkyldiethylenetriamine.

In still another embodiment, the amine comprises a N-heterocyclic compound. A particularly preferred heterocyclic compound is morpholine. Other 6-membered heterocyclic compounds include pyridine, quinoline, oxazine, etc. Heterocyclic 5-member rings include pyrrole, oxazole, pyrazole, imidazole, triazole, indole, indazole, etc., as well as thiazole, thiophthene, thianaphthene, etc., and these heterocyclic rings having substitutions and particularly hydrocarbyl groups attached thereto. Of the hydrocarbyl groups, alkyl groups are particularly preferred and more particularly alkyl groups containing from 1 to 12 carbon atoms each. Nonhydrocarbon groups include those containing nitrogen, sulfur and/or oxygen.

In another embodiment the nitrogen-containing compound contains one or more hydroxyl radicals in addition to one or more nitrogen atoms. In one embodiment the nitrogen-containing atom is a monoalkanolamine including ethanolamine, propanolamine, butanolamine, pentanolamine, hexanolamine, heptanolamine, octanolamine, nonanolamine, decanolamine, undecanolamine, dodecanolamine, tridecanolamine, tetradecanolamine, pentadecanolamine, hexadecanolamine, heptadecanolamine, octadecanolamine, nonadecanolamine, eicosanolamine, etc., and particularly these alkanolamines in which on or both of the amino hydrogens is replaced by an alkyl group, the alkyl group containing from 1 to 25 or more carbon atoms. Illustrative substituted alkanolamines include N-methyl-ethanolamine,
N-ethyl-ethanolamine,
N-propyl-ethanolamine,
N-butyl-ethanolamine,
N-pentyl-ethanolamine,
N-hexyl-ethanolamine,
N-heptyl-ethanolamine,
N-octyl-ethanolamine, etc.,
N,N-dimethyl-ethanolamine,
N,N-diethyl-ethanolamine,
N,N-dipropyl-ethanolamine,
N,N-dibutyl-ethanolamine,
N,N-dipentyl-ethanolamine,
N,N-dihexyl-ethanolamine,
N,N-diheptyl-ethanolamine,
N,N-dioctyl-ethanolamine, etc., as well as similarly substituted alkanolamines in which the alkanol moiety contains from 3 to 25 carbon atoms. It is understood that the alkanolamine may contain an aliphatic substituent attached to one or more of the carbon atoms forming the alkanol group. Furthermore, it is understood that a mixture of the alkanolamines may be used, preferably being selected from those hereinbefore set forth, and also that the substitution may comprise cycloalkyl and particularly cyclohexyl.

In another embodiment the alkanolamine contains at least two hydroxyl groups and one amino group or at least one hydroxy group and two amino groups. The embodiment of the alkanolamine containing two hydroxyl and one amino groups are dialkanolamines and preferably N-aliphatic-dialkanolamines in which the aliphatic group attached to the nitrogen atom contains from 1 to 25 or more carbon atoms. The alkanol groups preferably contain from about 2 to about 4 carbon atoms each, although it is understood that they may contain up to about 20 carbon atoms each. Preferably the N-aliphatic-dialkanolamine is an N-alkyl-diethanolamine. Illustrative compounds include N-methyl-diethanolamine,
N-ethyl-diethanolamine,
N-propyl-diethanolamine,
N-butyl-diethanolamine,
N-pentyl-diethanolamine,
N-hexyl-diethanolamine,
N-heptyl-diethanolamine,
N-octyl-diethanolamine,
N-nonyl-diethanolamine,
N-decyl-diethanolamine,
N-undecyl-diethanolamine,
N-dodecyl-diethanolamine,
N-tridecyl-diethanolamine,
N-tetradecyl-diethanolamine,
N-pentadecyl-diethanolamine,
N-hexadecyl-diethanolamine,
N-heptadecyl-diethanolamine,
N-octadecyl-diethanolamine,
N-nonadecyl-diethanolamine,
N-eicosyl-diethanolamine,
N-heneicosyl-diethanolamine,
N-docosyl-diethanolamine,
N-tricosyl-diethanolamine,
N-tetracosyl-diethanolamine,
N-pentacosyl-diethanolamine, etc.

In some cases, N-alkenyl-diethanolamines may be utilized. Illustrative N-alkenyl-diethanolamines include N-hexenyl-diethanolamine,
N-heptenyl-diethanolamine,
N-octenyl-diethanolamine,
N-noneyl-diethanolamine,
N-decenyl-diethanolamine,
N-undecenyl-diethanolamine,
N-dodecenyl-diethanolamine,
N-tridecenyl-diethanolamine,
N-tetradecenyl-diethanolamine,
N-pentadecenyl-diethanolamine,
N-hexadecenyl-diethanolamine,
N-heptadecenyl-diethanolamine,
N-octadecenyl-diethanolamine,
N-nonadecenyl-diethanolamine,
N-eicosenyl-diethanolamine, etc.

It is understood that the N-aliphatic-diethanolamines may contain an aliphatic substituent attached to one or both of the carbon atoms forming the ethanol groups. These compounds may be illustrated by N-aliphatic-di-(1-methyl-ethanolamine), N-aliphatic-di-(1 - ethyl - ethanolamine), N-aliphatic-did-(1 - propyl-ethanolamine), N - aliphatic-di-(1-butyl-ethanolamine), N-aliphatic-di - (1 - pentyl-ethanolamine), N-aliphatic-di-(1-hexyl-ethanolamine), etc., N-aliphatic-di-(2-methyl-ethanolamine), N-aliphatic-di-(2-ethyl-ethanolamine), N-aliphatic-di-(2-propyl - ethanolamine), N-aliphatic-di-(2-butyl-ethanolamine), N-aliphatic-di-(2-pentyl-ethanolamine), N-aliphatic-di-(2-hexyl-ethanolamine), etc. It is understood that these specific compounds are illustrative only and that other suitable compounds containing the diethanolamine configuration may be employed.

The specific compounds hereinbefore set forth are examples of N-aliphatic-diethanolamines. Other N-aliphatic-dialkanolamines include N-aliphatic-dipropanolamines and N-aliphatic-dibutanolamines, although N-aliphatic-dipentanolamines, N-aliphatic-dihexanolamines and higher dialkanolamines may be used. It is understood that these dialkanolamines may be substituted in a manner similar to that specifically described hereinbefore in connection with the discussion of the diethanolamines. Furthermore, it is understood that mixtures of N-aliphatic-dialkanolamines may be employed, preferably being selected from those hereinbefore set forth, and also that the substitution may comprise cycloalkyl and particularly cyclohexyl. Also, it is understood that the various dialkanolamines are not necessarily equivalent.

A number of N-alkyl-diethanolamines are available commercially and are advantageously used in preparing the condensation product. For example, N-tallow-diethanolamine is available under the trade name of "Ethomeen T/12." This material is a gel at room temperature, has an average molecular weight of 354 and a specific gravity at 25°/25° C. of 0.916. The alkyl substituents contain from about 12 to 20 carbon atoms per group and mostly 16 to 18 carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain 16 to 18 carbon atoms per group. Still another commercially available product is "Ethomeen C/12," which is N-coco-diethanolamine, and is a liquid at room temperature, and has an average molecular weight of 303 and a specific gravity at 25°/25° C. of 0.874. The alkyl groups contain mostly 12 carbon atoms per group, although it also contains groups having from 8 to 16 carbon atoms per group. Still another commercially available product is N-stearyl-diethanolamine, which is marketed under the trade name of "Ethomeen 18/12." This product is a solid at room temperature, has an average molecular weight of 372 and a specific gravity at 25°/25° C. of 0.959. It contains 18 carbon atoms in the alkyl substituent.

When the alkyanolamine contains one hydroxyl and two amino groups, a preferred alkanolamine is aminoalkyl alkanolamine. The aminoalkylalkanolamine preferably contains from 4 and preferably from 6 to 25 or more carbon atoms. Illustrative compounds include aminoethyl ethanolamine, aminoethyl propanolamine, aminoethyl butanolamine, aminoethyl pentanolamine, aminoethyl hexanolamine, etc., aminopropyl ethanolamine, aminopropyl propanolamine, aminopropyl butanolamine, aminopropyl pentanolamine, aminopropyl hexanolamine, etc., aminobutyl ethanolamine, aminobutyl propanolamine, aminobutyl butanolamine, aminobutyl pentanolamine, aminobutyl hexanolamine, etc., aminopentyl ethanolamine, aminopentyl propanolamine, aminopentyl butanolamine, aminopentyl pentanolamine, aminopentyl hexanolamine, etc., aminohexyl ethanolamine, aminohexyl propanolamine, aminohexyl butanolamine, aminohexyl pentanolamine, aminohexyl hexanolamine ,etc. Here again, one or both of the nitrogen atoms of the aminoalkyl alkanolamine may contain hydrocarbon substituents and particularly alkyl group or groups of from 1 to 20 or more carbon atoms each, or cycloalkyl groups and particularly cyclohexyl, or mixtures thereof. In another embodiment the corresponding thioalkanolamines may be used.

The phenylene diamine antiozonant, other nitrogen-containing compound and other additives are added to the rubber polymer in any suitable manner. When desired, any suitable solvent may be used along with one or more of these additives. These additives may be incorporated in the rubber polymer separately or in any desired mixture thereof. However, as hereinbefore set forth, the phenylene diamine antiozonant and other nitrogen-containing compound will be added to the rubber polymer prior to vulcanization thereof. Generally, these are incorporated into a rubber polymer by milling. It is understood that any other suitable method of incorporating these in the rubber polymer may be employed.

The phenylene diamine antiozonant generally will be incorporated in the rubber polymer in a concentration of from about 0.5% to about 5% and preferably from about 2% to about 4% by weight of the rubber hydrocarbon. These concentrations are based upon the rubber hydrocarbon exclusive of the other components of the final rubber composition, and are used in this manner in the present specifications and claims. The other nitrogen-containing compound will be used in a concentration of from about 10% to 200% or more by weight of the phenylene diamine antiozonant. The other additives incorporated in the rubber polymer will be used in concentrations normally employed for such additives.

Vulcanization of the rubber polymer will be effected in the normal manner. However, it is expected that the nitrogen-containing compound will lower the scorch time and, accordingly, the vulcanization should be modified to compensate for this.

It is understood that the rubber may be synthetic or natural rubber. In general, rubber is classified as a vulcanizable diene hydrocarbon rubber and comprises polymers of conjugated 1,3-dienes, either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber (NBR) produced from butadiene and acrylonitrile, butyl rubber produced from butadiene and isobutylene, neoprene, etc. The nautral rubbers include Hevea rubber, caoutchouc, balata, gutta-percha, etc. It is understood that the term rubber as used in the present specifications and claims is intended to include both synthetic rubber and natural rubber which undergo cracking due to ozone.

The following examples are introduced to illustrate further the novelty and utility of the present invention but not with the intention of unduly limiting the same.

EXAMPLE I

The phenylene diamine antiozonant used in this example is N,N'-di-(1,4-dimethylpentyl)-p-phenylene diamine. The other nitrogen-containing compound of this example is cyclohexylamine. The base rubber used in this example was of the following recipe.

TABLE I

| Ingredient: | Parts by weight |
|---|---|
| SBR–1052 | 100 |
| Furnace black | 40 |
| Zinc oxide | 3 |
| Stearic acid | 2 |
| Sulfur | 2 |
| Accelerator [1] | 1.25 |

[1] N-cyclohexyl-2-benzothiazole-sulfenamide.

The different rubber samples were separately cured for 40 minutes at 284° F. and were evaluated for antiozonant activity. In endeavoring to determine the concentration of antiozonant remaining in the samples, the samples after vulcanization were extracted with toluene and analyzed by gas chromatography to determine the amount of antiozonant.

The properties of the cured rubber samples were evaluated by preparing conventional dumbell specimens and elongating different specimens 10%, 15% or 20%. The elongated samples then were placed in a mast cabinet and exposed at 100° F. to 50 parts of ozone per 100 million parts of air. The time to first crack was determined.

The control sample, not containing the antiozonant or cyclohexylamine, underwent cracking within one hour for all samples elongated 10%, 15% and 20%.

The samples of rubber containing 1.75 parts of the phenylene diamine antiozonant per 100 parts of rubber were crack free for more than 168 hours for the sample elongated 10%. The samples elongated 15% and 20% underwent initial cracking between 96 and 168 hours of exposure.

Samples of the same rubber containing 0.23, 0.46 or 1.15 parts of cyclohexylamine per 100 parts of rubber but not containing the phenylene diamine antiozonant underwent cracking within one hour for all samples elongated 10%, 15% or 20%.

The samples of rubber containing 1.75 parts of the phenylene diamine antiozonant and 0.46 part of cyclohexylamine did not undergo cracking for greater than 168 hours for the samples elongated 10%, 15% or 20%. Other samples containing both of these additives in concentration of 1.75 parts of the antiozonant and 1.15 parts of cyclohexylamine also did not undergo cracking for greater than 168 hours for the samples elongated 10%, 15% or 20%.

The above data demonstrate that the samples containing both the phenylene diamine antiozonant and cyclohexylamine imparted greater stability to the rubber samples than was imparted to the samples containing the phenylene diamine antiozonant but not cyclohexylamine.

It will be noted that the concentration of antiozonant used in this example was only 1.75 parts. This is lower than the concentration of antiozonant normally employed. Accordingly, the present invention offers the advantage of utilizing a lower concentration of the more expensive antiozonant and substituting therefor another nitrogen-containing compound which is less expensive and which has little or no antiozonant activity by itself.

As hereinbefore set forth the reason for the improved results is that the cyclohexylamine reduces the loss or destruction of the phenylene diamine antiozonant during vulcanization. In an attempt to confirm this, the different samples of the rubber after vulcanization were extracted with toluene and analyzed by gas chromatography. It was found that the sample containing the phenylene diamine antiozonant but no cyclohexylamine lost about 25 weight percent of the antiozonant. In contrast, the sample containing both the phenylene diamine antiozonant and 1.15 parts of cyclohexylamine lost less than 1% by weight of the antiozonant. This confirms the fact that the reduced stability against ozone attack is due to the loss of the antiozonant and that such loss may be reduced by incorporating a nitrogen-containing compound of different composition in the rubber polymer.

EXAMPLE II

Another series of runs was made in substantially the same manner as described in Example I except that the other nitrogen-containing compound was diphenyl guanidine. Samples containing 1.2 and 2.4 parts of diphenyl guanidine per 100 parts of rubber but not containing the phenylene diamine antiozonant underwent cracking within one hour for the samples elongated 10%, 15% or 20%. However, the samples containing 1.75 parts of the phenylene diamine antiozonant and either 1.2 or 2.4 parts of diphenyl guanidine all were crack-free for greater than 168 hours for the samples elongated 10%, 15% or 20%. Here again, it is demonstrated that the other nitrogen-containing compound improved the stability of the rubber containing the antiozonant. This is seen by comparing the samples elongated 15% and 20% which had a stability of greater than 168 hours with the samples containing the same amount of phenylene diamine antiozonant but not the diphenyl guanidine which underwent cracking before 168 hours of exposure in the ozone cabinet.

Again these samples were extracted with toluene and analyzed by gas chromatography. It will be recalled that the sample containing 1.75 parts of antiozonant and not the other nitrogen-containing compound lost about 25% of the antiozonant during vulcanization. In contrast, the sample containing 1.75 parts of the phenylene diamine antiozonant and 2.4 parts of the diphenyl guanidine lost less than 20% of the antiozonant during vulcanization.

EXAMPLE III

Another series of runs was made in substantially the same manner as described in Example I, utilizing the same rubber recipe and the same phenylene diamine antiozonant. However, the other nitrogen-containing compound of this example was aniline.

As shown in Example I, the phenylene diamine antiozonant lost about 25% by weight of the phenylene diamine antiozonant during curing. Another sample of the rubber containing both 1.75 parts of the phenylene diamine antiozonant and 1 part of aniline lost about 21% by weight of the antiozonant during curing. Thus, the less expensive aniline served to reduce the loss of the more expensive phenylene diamine antiozonant by more than 15%.

EXAMPLE IV

Another series of runs was made in substantially the same manner as described in Example I except that the phenylene diamine antiozonant was used in a concentration of 2.4 parts and the other nitrogen-containing compound was diethanolamine. The diethanolamine was used in a concentration of 1 part. In this example the phenylene diamine antiozonant lost about 18% during vulcanization. The sample containing 2.43 parts of the phenylene diamine antiozonant and 1 part of diethanolamine lost less than 14% of the antiozonant during vulcanization, thus showing a gain of over 20% of antiozonant preserved in the rubber.

EXAMPLE V

Another series of tests was made in a manner similar to that described in Example I except that the phenylene diamine antiozonant used in this example was N-phenyl-N'-(1,3-dimethylbutyl)-p-phenylene diamine. The antiozonant was used initially in a concentration of 2.14 parts. However, after curing, it was found that the antiozonant remaining was only 1.91 parts, thus showing a loss of over 10% of the phenylene diamine antiozonant after vulcanization of the rubber.

The loss of antiozonant as described above is reduced by also incorporating in the rubber polymer 2 parts of N-tallow-1,3-diaminopropane prior to vulcanization.

EXAMPLE VI

In another test made in substantially the same manner as described in Example V except that the accelerator (N - cyclohexyl - 2 - benzothiazole - sulfenamide) was used in a concentration of 2.5 parts. After curing, it was found that the phenylene diamine antiozonant was lost in a weight concentration of over 16% by weight.

EXAMPLE VII

Another series of experiments was made in substantially the same manner as hereinbefore set forth except that the antiozonant used in this example was N,N'-di-(1-ethyl-3-methylpentyl)-p-phenylenediamine. The phenylene diamine antiozonant was added in a concentration of 1 part by weight (0.67% by weight). After vulcanization in the normal manner, it was found by gas chromatographic analysis that the concentration of antiozonant remaining was 0.43% by weight, thus showing a loss of about 35% by weight of the antiozonant during curing.

In another test made in substantially the same manner as described above, the amount of antiozonant added initially was 1.34% by weight. After curing, analysis showed that there remained only 1.08% by weight of the phenylene diamine antiozonant, a loss of almost 20% of the antiozonant during curing.

EXAMPLE IX

Another series of evaluations was made as substantially described in the previous example except that the antiozonant employed in this example was N,N'-di-(1-methylheptyl)-p-phenylene diamine. In one sample, 1 part (0.67% by weight) of the antiozonant was added to the rubber polymer. After curing, analysis found only 0.41% by weight of antiozonant, thus showing a loss of almost 40% of the antiozonant during curing.

In another series, the above antiozonant was incorporated in a concentration of 1.34% by weight. After curing, analysis found 0.96% by weight of antiozonant remaining, thus showing a loss of over 25% of the antiozonant during vulcanization.

EXAMPLE X

In still another series of tests similar to those described in Examples VIII and IX, a mixture of N,N-di-(1-ethyl-3-methylpentyl)-p-phenylene diamine and N,N'-di-(1-methylheptyl)-phenylene diamine was used as the antiozonant. When this mixture was added in a total concentration of 1.34% by weight, comprising 0.67% by weight of each compound, after curing analysis showed 0.96% by weight of antiozonant remaining. This amounts to a loss of over 25% of the antiozonant during vulcanization.

EXAMPLE XI

A completely different series of tests was made using the same recipe as described in Example I. The antiozonant used in this series of tests was N,N'-di-(1,4-dimethylpentyl)-p-phenylene diamine. In this series of tests it was found that, when 1.75 parts (1.17%) by weight of the antiozonant was incorporated in the rubber recipe, 13.7% of the antiozonant was lost during curing.

The series of tests was made to determine the effect of the alkyl configuration in the amine used as the additional component. Accordingly, separate evaluations were made using n-butylamine, sec-butylamine, tert-butylamine and isobutylamine. All of these evaluations were made using 0.75 part by weight of the butylamine. The results of these evaluations are shown in the following table.

TABLE II

| Amine | Antiozonant, wt. percent | |
|---|---|---|
|  | Original | After Curing |
| None | 1.17 | 1.01 |
| n-Butylamine | 1.17 | 1.16 |
| Sec-butylamine | 1.17 | 1.17 |
| Tert-butylamine | 1.17 | 1.15 |
| Isobutylamine | 1.17 | 1.17 |

From the data in the above table, it will be seen that the different butylamines were very effective in preventing loss of phenylene diamine antiozonant during vulcanization.

EXAMPLE XII

Another set of experiments was made in the same manner as described in Example XI but using morpholine as the other amine compound. The morpholine was incorporated in a concentration of 0.75 part by weight. Here again it was found that there was no loss of the phenylene diamine antiozonant during the curing.

I claim as my invention:

1. A rubber composition selected from the group consisting of (A) a vulcanizable rubber mixture containing a stabilizing amount of a phenylenediamine antiozonant and from about 10 to about 200 percent by weight of said antiozonant of an amine compound selected from the group consisting of N-alkyl-diamino-alkanes containing from 1 to about 25 carbon atoms in said alkyl and from 2 to about 6 carbon atoms in said alkane moiety, cycloalkylamines containing from 4 to about 8 carbon atoms in said cycloalkyl moiety, alkanolamines containing from 2 to about 25 carbon atoms in said alkanol moiety, and N-heterocyclic compounds having 5 or 6 members in the heterocyclic ring; and (B) the vulcanizate of the rubber mixture of (A).

2. The composition of claim 1 in which said phenylene diamine antiozonant is an N,N'-di-sec-alkyl-p-phenylene diamine in which the alkyl groups contain from 3 to about 20 carbon atoms each.

3. The composition of claim 1 in which said phenylene diamine antiozonant is an N-sec-alkyl-N'-phenyl-p-phenylene diamine in which said alkyl contains from 3 to about 20 carbon atoms.

4. The composition of claim 1 in which said phenylene diamine antiozonant is N,N'-dicyclohexyl-p-phenylene diamine.

5. The composition of claim 1 in which said amine compound is an ethanolamine.

6. The composition of claim 1 in which said amine compound is an aminoalkyl alkanolamine containing from about 2 to about 25 carbon atoms in said alkyl moiety.

7. The composition of claim 1 in which said amine compound is a cyclohexylamine.

8. The composition of claim 1 in which said amine compound is a morpholine.

References Cited

UNITED STATES PATENTS

| 3,163,616 | 12/1964 | Stahly | 260—28.5 |
| 3,238,177 | 3/1966 | Chenicek | 260—45.9 |
| 3,274,250 | 9/1966 | Schneider | 260—576 |
| 3,304,285 | 2/1967 | Cox | 260—45.9 |
| 3,342,865 | 9/1967 | Oberster | 260—576 |
| 3,384,614 | 5/1968 | Rosenwald | 260—45.9 |
| 3,388,096 | 6/1968 | Smith | 260—45.9 |

HOSEA E. TAYLOR, Jr., Primary Examiner

R. A. WHITE, Assistant Examiner

U.S. Cl. X.R.

260—45.9, 800, 801, 809